United States Patent [19]

Kimura et al.

[11] Patent Number: 5,187,616
[45] Date of Patent: Feb. 16, 1993

[54] RECORDING APPARATUS AND DUBBING SYSTEM INCLUDING THE SAME

[75] Inventors: Norio Kimura, Kawasaki; Yoichi Yamagishi, Yokohama, both of Japan

[73] Assignee: Canon Kabushiki Kaisha, Tokyo, Japan

[21] Appl. No.: 457,173

[22] Filed: Dec. 26, 1989

[30] Foreign Application Priority Data

Dec. 26, 1988 [JP] Japan ............................. 63-326294
Jun. 2, 1989 [JP] Japan ............................. 1-140745
Nov. 27, 1989 [JP] Japan ............................. 1-308332

[51] Int. Cl.$^5$ ................................................ G11B 15/12
[52] U.S. Cl. ..................................... 360/61; 360/35.1
[58] Field of Search ............................. 360/15, 61-63, 360/27, 11.1, 35.1

[56] References Cited

U.S. PATENT DOCUMENTS 4,939,593 7/1990 Youchi et al. ..................... 360/11.1
4,996,610 2/1991 Yunoki et al. ....................... 360/61

Primary Examiner—Vincent P. Canney
Attorney, Agent, or Firm—Fitzpatrick, Cella, Harper & Scinto

[57] ABSTRACT

A dubbing system includes a dubbing apparatus in which a master apparatus reproduces a signal recorded on a recording medium capable of recording an image and audio thereon and a slave apparatus records on another recording medium. Each of the master apparatus and slave apparatus includes a communication circuit for mutual communication, and the communication circuit causes the master apparatus and slave apparatus to cooperatively operate, resulting in that a dubbing operation is almost automatically executed by an operator instructing only a start of a dubbing operation.

15 Claims, 14 Drawing Sheets

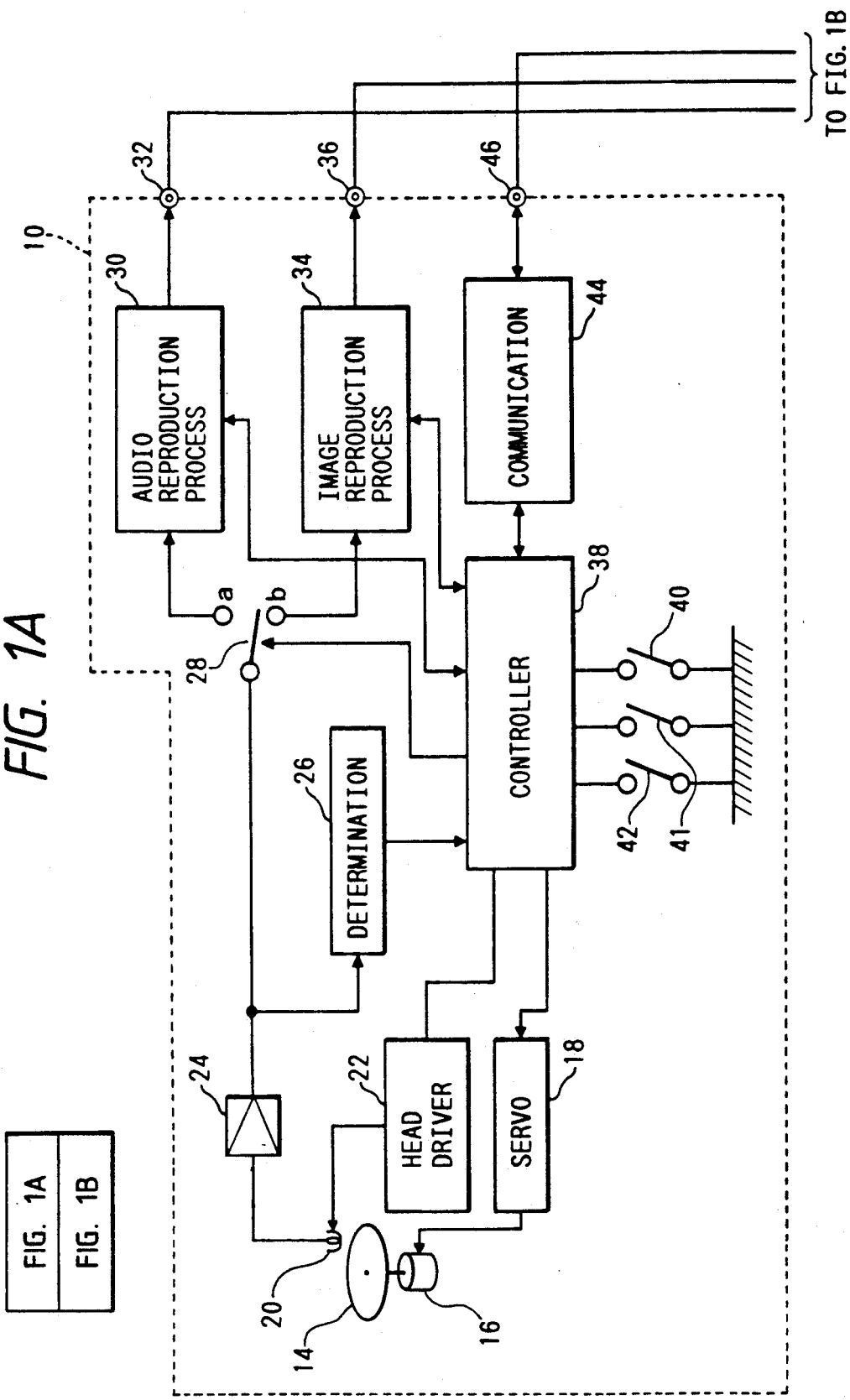

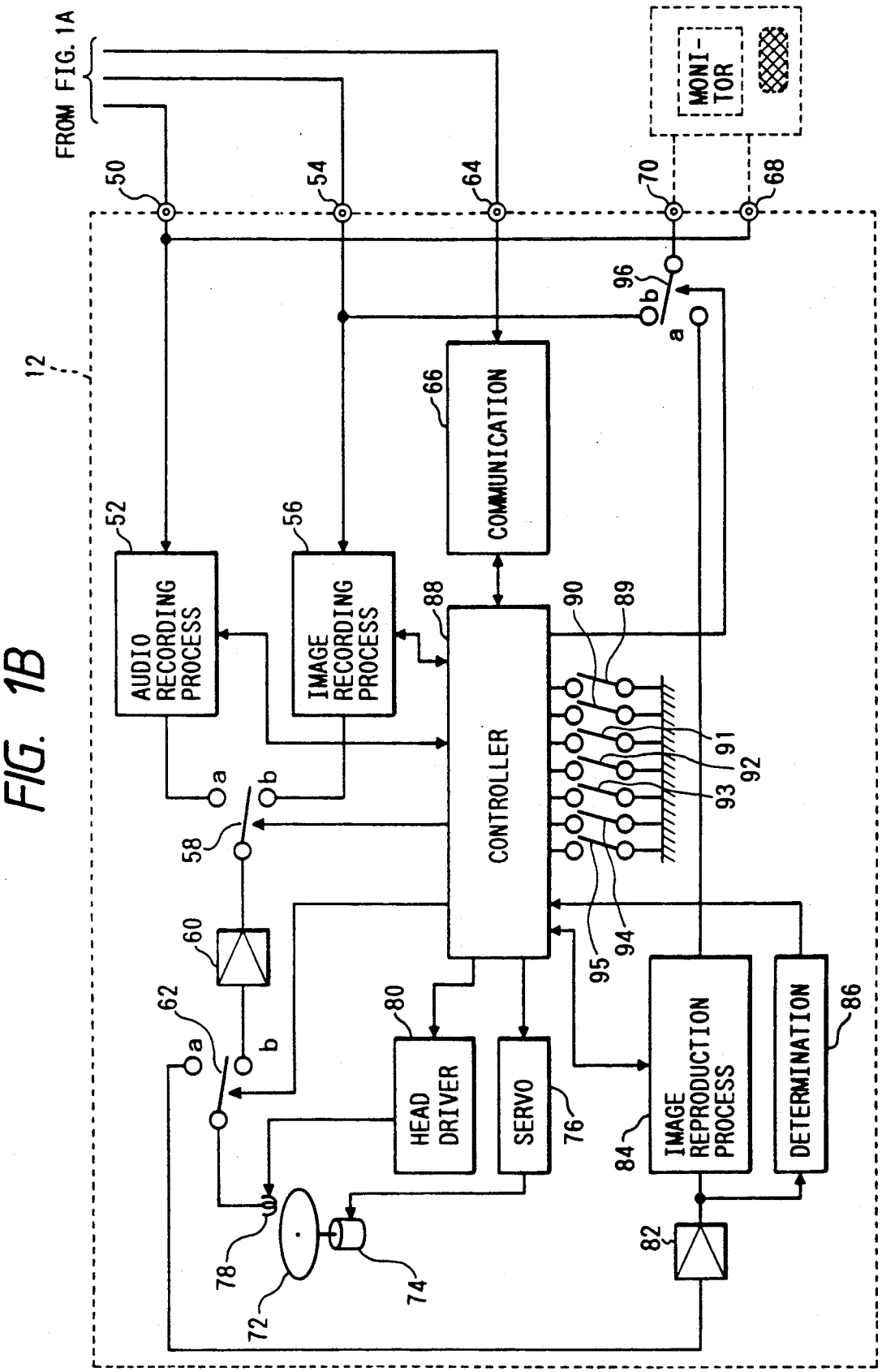

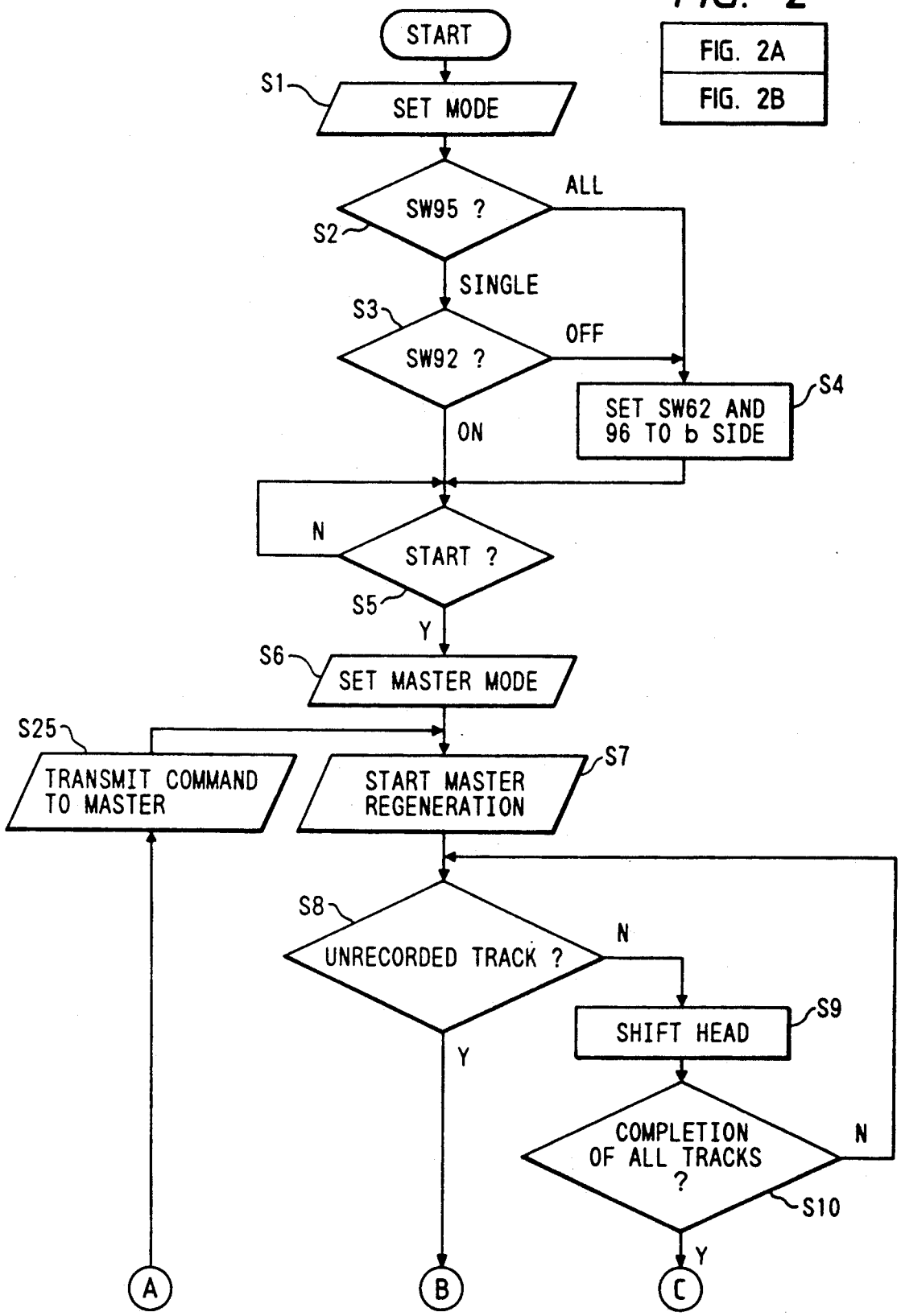

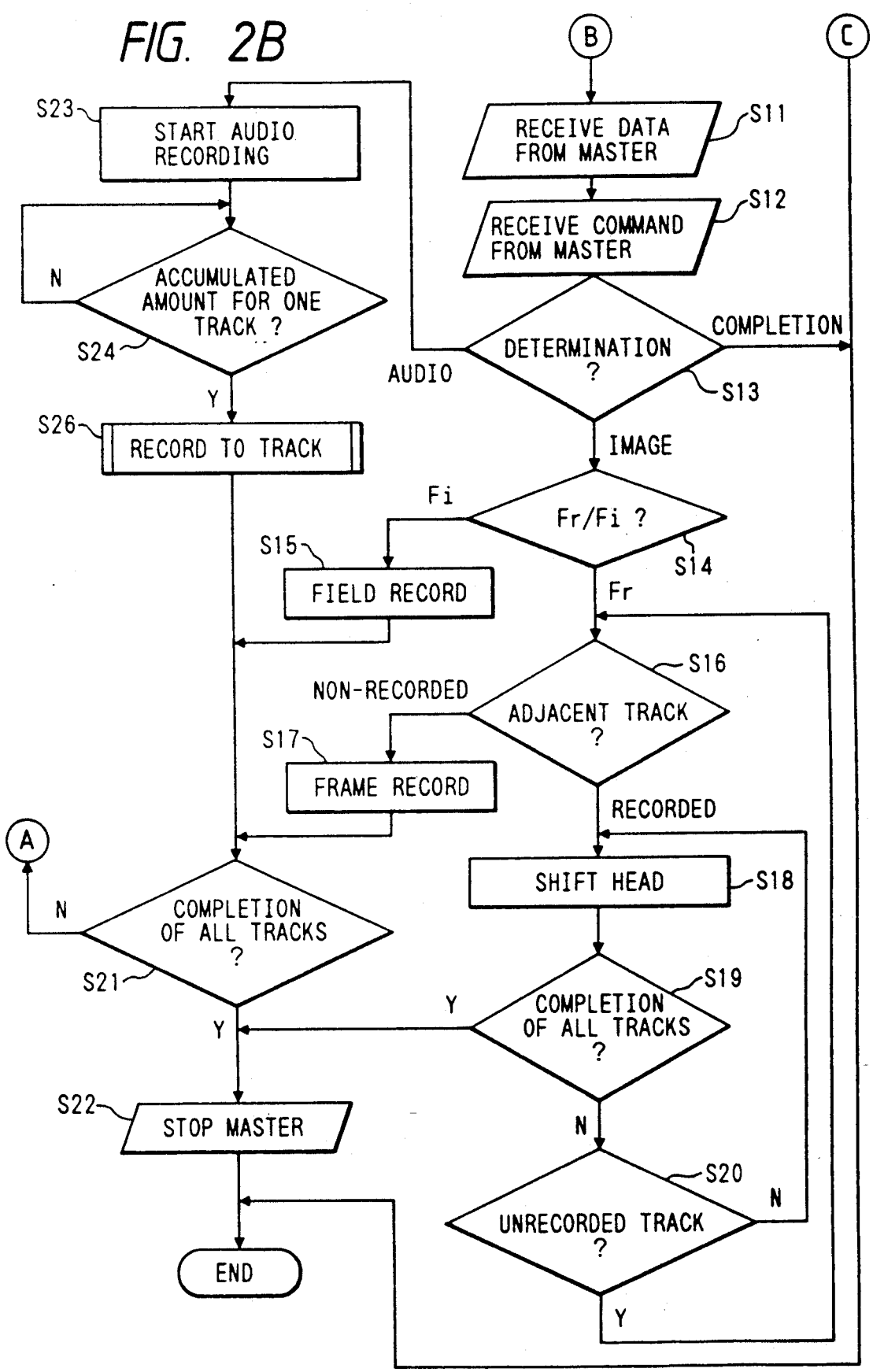

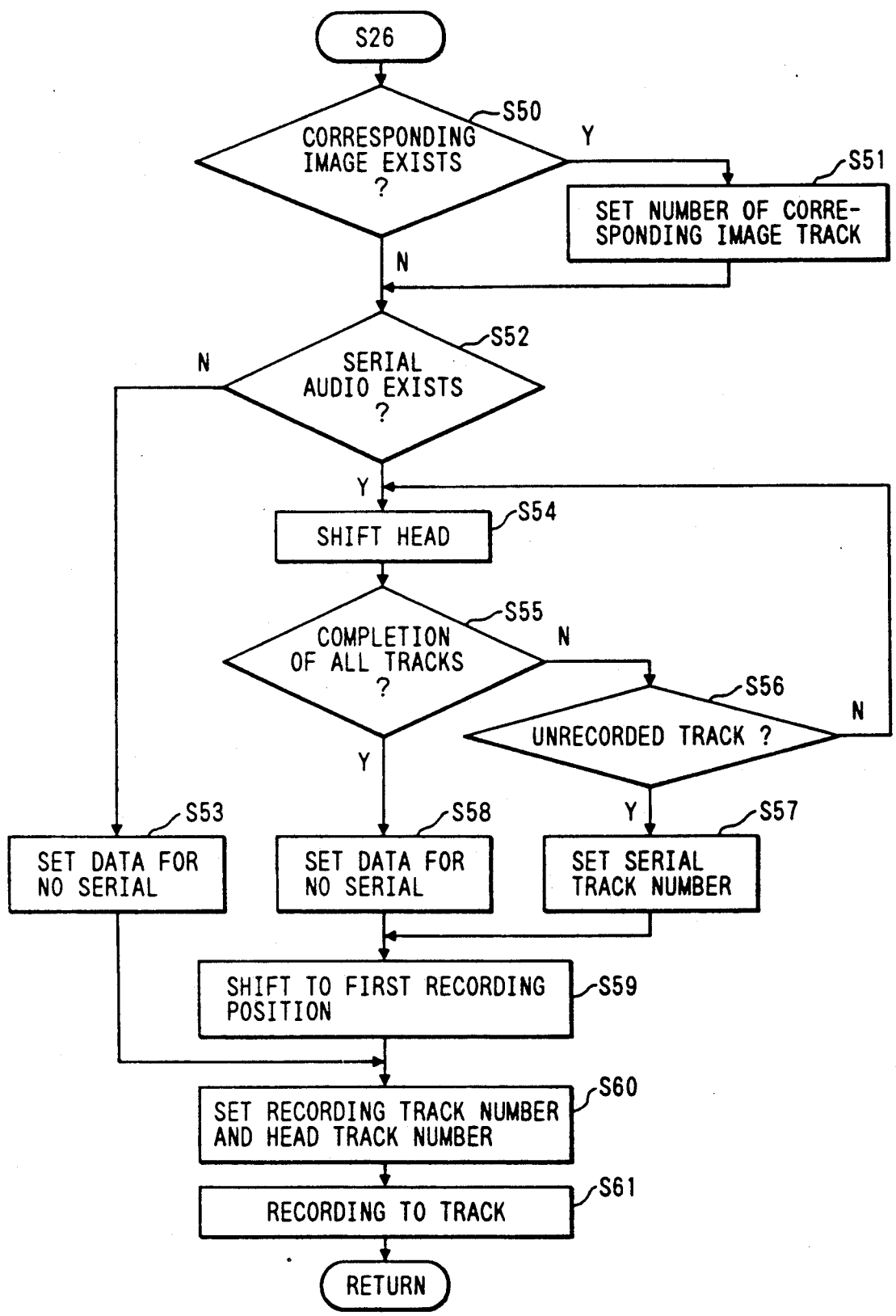

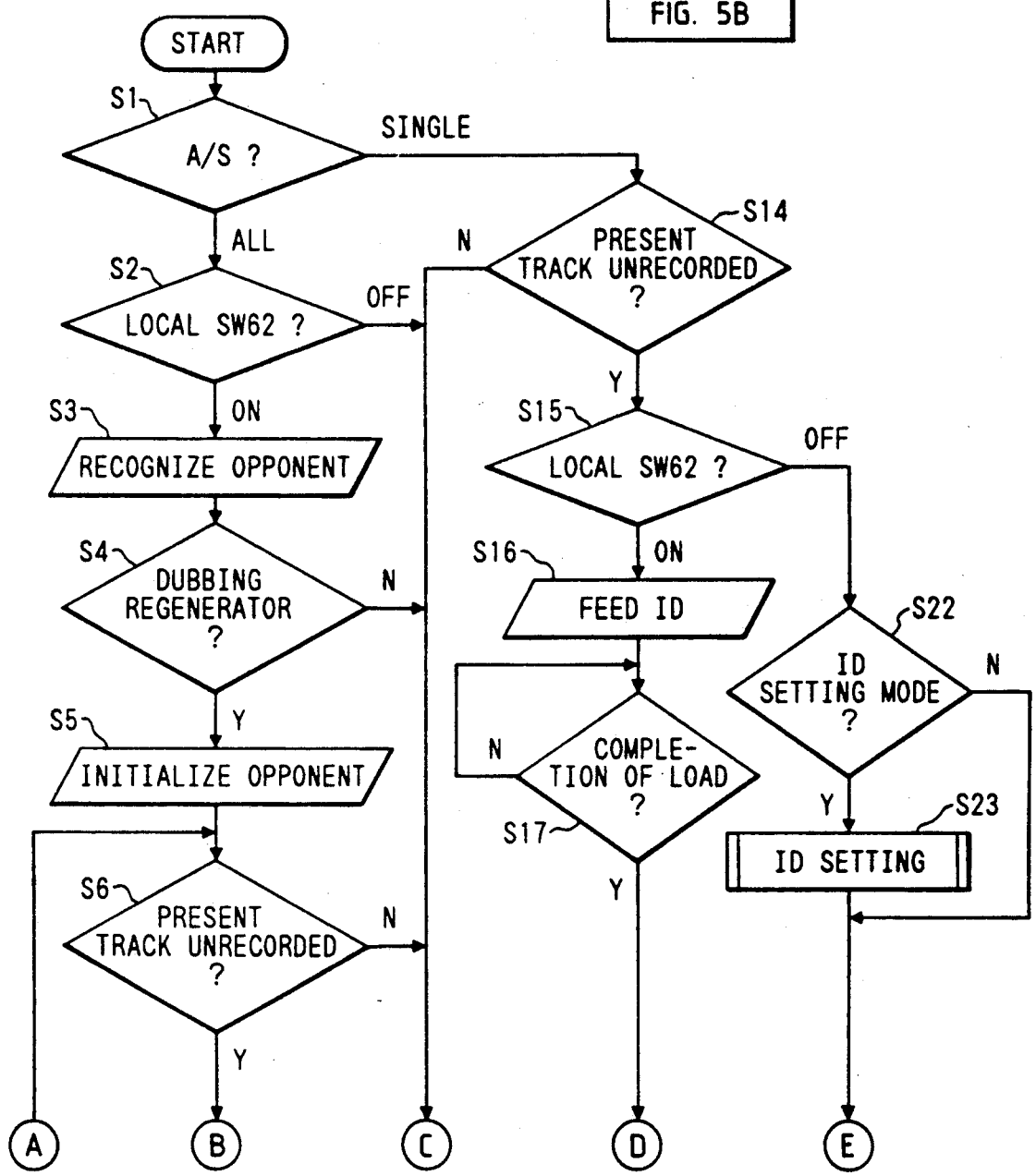

(a) 89:03:15
    12345678901
(b) 8_: :
(c) 89: :
(d) 89:_ :

RECORDING APPARATUS AND DUBBING SYSTEM INCLUDING THE SAME

BACKGROUND OF THE INVENTION

1. Field of the Invention

The present invention relates to a recording apparatus and a dubbing system including the same, and more particularly to a dubbing system for copying for example image and/or sound recorded on a recording medium onto another recording medium.

2. Related Background Art

In a conventional dubbing system, an original recording medium is loaded in a master unit composed of a reproduction apparatus while an unrecorded recording medium is loaded in a slave unit composed of a recording apparatus, and the dubbing operation is achieved by starting the recording operation in the slave unit simultaneously with the reproducing operation in the master unit.

In such a conventional structure, synchronization of the start of reproduction in the master unit with that of recording in the slave unit is to be done by the operator, and, in the conventional apparatus, the reproduction and recording have been started manually. More specifically, the dubbing operation is started after the selection of a track to be reproduced and a track for recording. However, in a system capable of recording image and sound in a mixed manner and capable of recording various information in various modes, the operating mode of the slave unit has to be changed according to the recording mode of the original medium. Consequently the conventional system has required extremely complex operations for the synchronized operation of the master and slave units. Thus the dubbing is started and stopped while monitoring the reproduced image or sound, so that the recording is often interrupted during operation or terminated by error. Also, in a case of reproducing an image and related data, there are required operations of confirming the data by reproduction on the slave unit, and dubbing the image by entering said data in the master unit, and the operation becomes very cumbersome as such operation is to be conducted for each track.

Also, as an example of such a system, there is already known a so-called still video system.

The recording unit of such a still video system records the image signal of a field on each of concentric tracks formed on a magnetic disk. The image signal is recorded either in a mode of recording an image signal of a field on a track (hereinafter called a field recording mode), or in a mode of recording the image signal of an odd field and an even field on two tracks thereby representing the image signal of a frame by the signal of two fields recorded on two tracks (hereinafter called a frame recording mode), and at the same time there is recorded an index (ID) signal indicating whether the image signal is recorded either in the field recording mode or in the frame recording mode.

During reproduction, the signal recorded on a desired track is reproduced by tracing said track with a magnetic head, then the ID signal is separated from the reproduced signal, and it is discriminated whether the separated ID signal indicates the frame recording mode or the field recording mode. If the image signal reproduced together with said ID signal from the desired track is identified as that of the frame recording mode, the reproduction is made in a mode in which the image signal of a frame is reproduced by alternately reproducing the desired track and a neighboring track in respective field periods (hereinafter called a frame reproducing mode). On the other hand, if the image signal reproduced together with the ID signal from said desired track is identified as that of the field recording mode, the reproduction is conducted by repeatedly reproducing said desired track and generating the image signal of a frame by forming an interpolated signal and a non-interpolated signal alternately in respective field periods from the thus reproduced signal, and delaying the interpolated signal by a half of the horizontal scanning period (½ H) for skew compensation (hereinafter called a field reproducing mode).

There is also known a so-called dubbing system in which the image signal reproduced from the magnetic disk in a reproducing unit is sent to another recording unit for copying on another magnetic disk.

FIG. 12 schematically shows the structure of a reproducing unit in a conventional dubbing system.

In FIG. 12, a magnetic disk 201 is rotated at a predetermined revolution by a motor 202, and magnetic heads 203a, 203b are moved by an unrepresented head moving mechanism, in response to an instruction from an operation unit, to desired tracks for reproduction, selected from plural concentric tracks formed on said magnetic disk 201. Signals recorded on said tracks are reproduced by the magnetic heads 203a, 203b, amplified by preamplifiers 204, 205 and respectively supplied to terminals a and b.

In response to an instruction from a system controller 219, a switch 206 is connected by a switch controller 218 to the terminal a during the initial operation, whereby the output of the pre-amplifier 204 is supplied to an ID signal demodulating circuit 209.

Said ID signal demodulating circuit 209 separates and demodulates the ID signal from the signal supplied from the pre-amplifier 204 through the switch 206, thereby reproducing, for supply to the system controller 219, ID data containing field/frame discrimination data indicating whether a signal reproduced by the head 203a is recorded in the field recording mode or in the frame recording mode.

The system controller 219 discriminates whether the field/frame discrimination data in the ID data supplied from the demodulating circuit 209 indicate either the field recording mode or the frame recording mode, and, in the case of the former, sends an instruction to the switch controller 218 for controlling the switch 206 according to the frame reproducing mode.

The switch controller 218 receives pulses corresponding to the frequency of rotation of the magnetic disk 201 from a pulse generation (PG) detecting circuit 217, and, in response to the instruction for the frame reproducing mode from the system controller 221, connects the switch 206 alternately to the terminals a and b at each revolution of the magnetic disk 201 in synchronization with said pulses.

In an unrepresented core of the magnetic disk 201, a magnetic member is provided for indicating the rotation period of said disk 201. A pulse generating (PG) coil 216 detects said magnetic member in each revolution of the magnetic disk 201 and generates a pulse, which is subjected to wave form shaping in the PG detecting circuit 217 and supplied to the switch controller 218 as a PG pulse representing the rotating period of the magnetic disk 201.

If the field/frame discrimination data in the ID data from the demodulating circuit 209 indicate the field recording mode, an instruction is sent to the switch controller 218 for controlling the switch 206 according to the field reproducing mode.

In this case the switch controller 218 continuously connects the switch 206 to the terminal a.

The signal released from the switch 206 is supplied to a luminance signal FM demodulating circuit 207 and a color difference signal FM demodulating circuit 208. The luminance signal demodulating circuit 207 extracts an FM luminance signal component from the signal supplied from the switch 206, demodulates said component and sends the demodulated signal to a luminance signal process circuit 210. Also, the color difference signal demodulating circuit 208 extracts an FM color difference line-sequential signal component from the signal supplied from the switch 206, then effects demodulation and sends the demodulated signal to a color difference signal process circuit 211.

Said process circuits 210, 211 effect different processes in the field reproducing mode and in the frame reproducing mode, according to the instruction from the system controller 219.

In the field reproducing mode, the luminance signal process circuit 210 effects de-emphasis on the demodulated luminance signal, then effects interpolation and skew compensation, and sends the obtained luminance signal Y to a composite video signal forming circuit 212. Also, the color difference signal process circuit 211 effects de-emphasis and interpolation on the demodulated color difference line-sequential signal, then effects a synchronizing process and further applies skew compensation to obtain two color difference signals R-Y, B-Y which are supplied to the composite video signal forming circuit 212.

In the frame reproducing mode, the luminance signal process circuit effects the de-emphasis on the demodulated signal but does not effect the interpolation and skew compensation, and sends the obtained signal, as the luminance signal Y, to the composite video signal forming circuit 212. The color difference signal process circuit 211 effects de-emphasis and synchronization on the demodulated line-sequential color difference signal without interpolation and skew compensation, and the obtained two signals are supplied, as the color difference signals R-Y, B-Y, to the composite video signal forming circuit 212.

The composite video signal forming circuit 212 utilizes the luminance signal Y from the process circuit 210 and the two color difference signals R-Y, B-Y from the process circuit 211 for forming a composite video signal, based for example on the NTSC system, which is released from an output terminal 213.

The reproducing apparatus shown in FIG. 12 is provided with dubbing output terminals 214, 215 which respectively release the output signals of the demodulating circuits 207, 208 for supply to other equipment.

The dubbing of the image signal recorded on the magnetic disk 201 onto another magnetic disk is conducted through said output terminals 214, 215. Different from the signals from the process circuits 210, 211, the signals released from the dubbing output terminals 214, 215 in the field reproducing mode are not subjected to interpolation and skew compensation, and are therefore free from the deterioration caused by said process circuits 210, 211. Also, since the luminance signal component and the line-sequential color difference signal component are supplied in separate states, the processes of mixing and separation of said components can be dispensed with in comparison with the case of dubbing in the state of a composite signal. Thus, there can be prevented signal deterioration resulting from said processes, and the signal reproduced from the disk 201 can be dubbed onto another magnetic disk without deterioration.

However, in a case of a dubbing operation utilizing the above-mentioned dubbing output terminals, if the reproducing unit reproduces the signal in the field reproducing mode while the recording unit records the signal in the frame recording mode, the image signal of a field is recorded on two adjacent tracks of the latter disk, with an ID signal indicating the frame recording mode. If the image signal of said disk is reproduced according to the ID signal recorded therein, the signals recorded on two tracks are merely reproduced alternately without interpolation or skew compensation with aberrated synchronization signals, since the ID signal indicates the frame recording mode. Such output signals cannot provide a proper image on the monitor.

SUMMARY OF THE INVENTION

In consideration of the foregoing, an object of the present invention is to provide a recording apparatus capable of individually or totally solving the above-mentioned drawbacks, and a dubbing system including such a recording apparatus.

Another object of the present invention is to provide a recording apparatus and a reproducing apparatus capable of automatic starting and stopping of a dubbing operation.

Still another object of the present invention is to provide a recording apparatus and a reproducing apparatus capable of automatically setting the sequence of dubbing in advance.

The foregoing objects of the present invention can be attained, according to a preferred embodiment of the present invention, by a system including a dubbing apparatus for reproducing, by a master unit, the signal recorded on a recording medium capable of recording image and sound, and recording a thus reproduced signal on another recording medium in a slave unit, wherein said master unit and said slave unit are respectively provided with communication circuits for mutual communication and are operated in cooperation, whereby the operator is merely required to instruct the start of dubbing and the dubbing operation can be made in almost an automatic manner.

Still another object of the present invention is to provide a dubbing system capable of modifying the content of data associated with the image.

Still another object of the present invention is to provide a dubbing system enabling one to confirm the content of data associated with the image.

Still another object of the present invention is to prevent erroneous recording of a field image signal in the frame recording mode at the dubbing operation.

Still other objects of the present invention, and the advantages thereof, will become fully apparent from the following description of embodiments, which is to be taken in conjunction with the attached drawings.

BRIEF DESCRIPTION OF THE DRAWINGS

FIG. 1A and B are block diagram of a first embodiment of the present invention;

FIGS. 2A and B and 3 are flow charts of the operation thereof;

DESCRIPTION OF THE PREFERRED EMBODIMENTS

Figure 4:
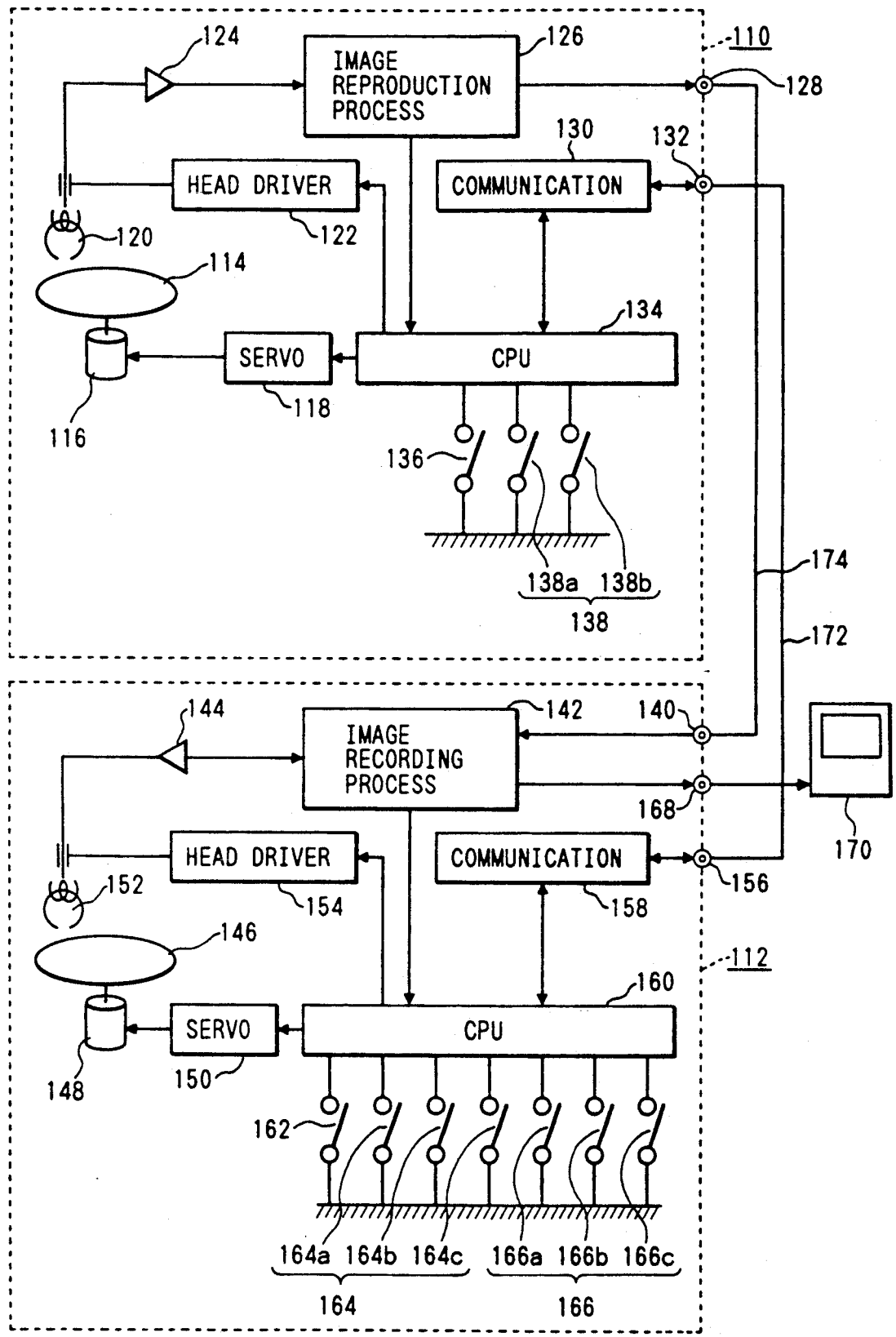
FIG. 4 is a block diagram of a second embodiment of the present invention.

Now the present invention will be clarified in detail by embodiments thereof shown in the attached drawings. In the following embodiment there is described an apparatus applicable to a so-called still video photo system in which an image signal and an audio signal can be selectively recorded on concentric tracks of a disk-shaped recording medium, and, if an image signal exists corresponding to the audio signal, data indicating the track number of said image signal are recorded in superposition with the audio signal, but the present invention is not limited to such apparatus.

FIG. 1 is a block diagram of an embodiment of the present invention, wherein shown are a master unit 10, and a slave unit 12. The master unit 10 is provided with a magnetic disk 10 to be copied, a spindle motor 16 for rotating said magnetic disk 14, a servo circuit 18 for maintaining the spindle motor 16 at a constant revolution, a magnetic head 20, a head driving circuit 22 for moving and positioning the magnetic head 20 in the radial direction of the magnetic disk 12, a reproducing amplifier 24, a determining circuit 26 for determining an unrecorded/audio/image state from the output of the reproducing amplifier 24, a switch 28, an audio reproduction process circuit 30, an audio signal output terminal 32, an image reproduction process circuit 34, an image signal output terminal 36, a control circuit 38 composed of a microcomputer, a RAM, a ROM, etc. for controlling the entire master unit 10, a switch 40 for setting the dubbing mode, a switch 41 for moving the magnetic head 20 to the external side of the magnetic disk 14, a switch 42 for moving the magnetic head 20 to the internal side, a communication circuit 44 for effecting control data communication with the slave unit 12, and a communication terminal 46.

In the slave unit 12, there are provided an audio signal input terminal 50, an audio recording process circuit 52, an image signal input terminal 54, an image recording process circuit 56, a switch 58, a recording amplifier 60, a selector switch 62, a communication terminal 64, a communication circuit 66 for communication with the master unit 10, an audio output terminal 68 for monitoring, an image output terminal 70 for monitoring, a magnetic disk 72 for copying, a spindle motor 74, a servo circuit 76, a magnetic head 78, a head driving circuit 80, a reproducing amplifier 82, an image reproduction process circuit 84, a determining circuit 86 for determining a recorded/unrecorded state and an audio/image signal from the output of the reproducing amplifier, a control circuit 88 for controlling the entire slave unit 12, a switch 89 for setting the dubbing mode, a switch 90 for moving the magnetic head 78 to the external side, a switch 91 for moving the magnetic head to the internal side, a switch 92 for instructing image and audio recording in the off state but audio recording only in the on state, a recording start switch 93, a recording stop switch 94, a switch 95 for selecting an all mode for copying all in the on state, or a single mode for group copying in the off state, and a selector switch 96 for selecting either the image signal from the master unit 10 or the reproduced image signal from the image reproduction process circuit 84.

A group in the single mode means a field/frame image without corresponding sound, an independent sound or an independent continuous sound without corresponding image, or an image and corresponding sound or continuous sound.

Now there will be explained the function of the circuit shown in FIG. 1. FIGS. 2 and 3 are flow charts of the function of the slave unit 12. In the master unit 10, the control circuit 38 rotates the magnetic disk 14 at a constant revolution through the servo circuit 18 and the motor 16, and the magnetic head 20 is moved to a desired track by the switches 41, 42. Also, in the slave unit 12, the magnetic disk 72 is rotated at a constant speed, and the magnetic head 78 is moved to a desired track by the control circuit 88, in response to the actuation of the head moving switches 90, 91. The master unit 10 and the slave unit 12 are naturally set at the dubbing mode by the dubbing switches 40, 89, and the switches 92, 95 are also set (S1).

At first there will be explained a case in which an all dubbing mode is selected by the switch 95. In this case the sequence proceeds from a step S2 to S4 whereby the switches 62, 96 of the slave unit 12 are set at the side b. Thus, in the all dubbing mode, the image reproduced in the master unit 10 can be monitored through the image output terminal 70, and the sound reproduced by the master unit 10 can be monitored through the audio output terminal 68. Then the dubbing operation is started by the start switch 93 (S5), and the control circuit 88 sends an all dubbing command to the master unit 10 through the communication circuit and the communication terminal 64 (S6). Thereafter the master unit 10 executes a reproducing operation in the all dubbing mode. Subsequently, the slave unit 12 sends a start command to the master unit 10, which in response starts reproduction (S7).

If the magnetic head 20 of the master unit 10 is in contact with an image track (recording an image track) with corresponding audio recording, the switch 28 is connected to the side a, whereby the magnetic head 20 is moved to a first track of the corresponding sound and the reproduced signal is supplied to the audio reproduction process circuit 30. Circuit 30 executes demodulation, de-emphasis and noise elimination, then digitizes the signal and sends the corresponding image track number, own track number, track number of continued sound, compression rate, etc. to the control circuit 38, while storing the audio data only in an associated audio memory. After said storage, the switch 28 is shifted to the contact b, whereby the magnetic head 20 is moved to the aforementioned image track for effecting the reproduction. The reproduced signal is supplied to the image reproduction process circuit 34 for known processes such as de-emphasis and encoding, and is released, as a video signal, to the output terminal 36.

Then the switch 62 is shifted to the contact b, and the determining circuit 86 discriminates whether the track in contact with the magnetic head 78 is unrecorded (S8). If it is already recorded, the magnetic head 78 is shifted over all the tracks until an unrecorded track is found (S9, S10), and the switch 62 is shifted to the contact b when an unrecorded track is found.

Then the reproduced data from the master unit 10 are awaited (S11). In case they are image data, the switch 58 is connected to the contact b for enabling the recording of the image signal. Then a command from the master unit 10 is received (S11), and it is discriminated whether said command indicates a sound, an image or the end of a process (S13).

In the case of an image, the image recording process circuit 56 discriminates whether the input image signal is in the field mode or in the frame mode, and, in the case of the field mode, the control circuit 88 records the image signal of a track into the magnetic disk 72 (S15). In the case of the frame mode, since two adjacent unrecorded tracks are required, it is discriminated whether the adjacent track is unrecorded (S16). If unrecorded, recording is made in the frame mode (S17). If the adjacent track is already recorded, a search is made for two adjacent unrecorded tracks, over the entire tracks (S18, 19, 20). After the recording in the field mode (S15) or in the frame mode (S17), it is discriminated whether all the tracks of the magnetic disk 72 are used (S21), and, if not, a reproduction executing command is sent to the master unit 10 (S25).

In response, the master unit prepares for, if the sound is present corresponding to the abovementioned reproduced image, the output of audio data stored in the audio memory of the audio reproduction process circuit 30. In corresponding form, the slave unit 12 looks for an unrecorded track (S8, 9, 10), then receives the data on the compression rate and on the presence or absence of the continued sound of the sound reproduced from the master unit 10, and sets the compression rate, etc. on the audio recording process circuit 52. Then the master unit 10 executes D/A conversion on the audio data stored in the audio memory of the audio reproduction process circuit 30 with clock signals corresponding to the predetermined compression rate, releases the obtained signal from the output terminal 32, and sends an audio recording start command to the slave unit 12. Upon receipt of said command (S13), the slave unit 12 accesses the audio signal from the input terminal 50 into the audio recording process circuit 52, executes A/D conversion and stores the obtained signal in an incorporated memory. After the storage of the signal of a track, said signal is recorded on the magnetic disk 72 (S23, 24, 25).

The audio recording of a track is conducted as shown in FIG. 3. At first, if a corresponding image is present, the track number of said corresponding image is set in the audio recording process circuit 52 (S50, 51). If continued sound does not exist, corresponding data are set in the circuit 52 (S52, 53). If the continued sound exists, the magnetic head is shifted over all the tracks to look for an unrecorded track (S54, 55, 56), and, if an unrecorded track exists, the number thereof is set as a continued track number in the circuit 52 (S57). If the unrecorded track is absent, corresponding data are set in the circuit 52 (S58) and the head returns to the initial recording position (S59). After the step S53 or S59, the recording track number and the start track number are set in the circuit 52 (S60). Then the switch 62 is connected to the contact b while the switch 58 is connected to the contact a, whereby the audio data previously accumulated in the memory of the audio recording process circuit 52 are added with the data set as explained above, and are recorded on the magnetic disk 72 after D/A conversion, emphasis and modulation.

If the magnetic disk 72 contains an unrecorded track after the copying of image and sound in this manner (S21), a command requesting a next reproducing operation is sent to the master unit 10 (S25). If there is no unrecorded track, a stop command is sent to the master 10, thereby terminating the function of the master unit 10 and the slave unit 12 (S22).

In the following there will be explained the function of the single mode for copying only a group of recorded signals. In said single mode, the magnetic head 20 of the master unit 10 is moved to the first track of a group to be copied, by the head moving switches 41, 42. In the slave unit 12, the single mode is set by turning off the switch 95. After said setting (S1), the state of the switch 92 is discriminated (S2), and, if it is off, the switches 62, 96 are connected to the contacts b (S4). The subsequent function is basically the same as in the all copying mode explained above. After the reproduction and transmission of a group, the master unit 10 sends an end command to the slave unit 12 (S11), thereby terminating the function thereof. The function of the master unit 10 is terminated after the transmission of said command.

In the present embodiment, the master unit 10 and the slave unit 12 may naturally be constructed as an integrated unit or composed of two record/reproducing apparatuses. The communication by the communication circuits 44, 66 is not limited to a particular format but can be made in various forms, such as RS232C, TTL level communication or HDLC protocol.

As will be easily understood from the foregoing description, the present invention enables copying of a signal from an arbitrary record position of the original recording medium to an arbitrary position of the copying medium. Also, in the course of copying of an image, the copied image can be monitored, and, in a case of the image with corresponding sound, said sound can also be monitored.

FIG. 4 is a block diagram of a second embodiment of the present invention, capable of modifying, at the dubbing operation, the ID signal which is frequency superposed with the image signal. There are provided a slave unit 110 and a master unit 120, and said data are recorded on the magnetic disk, in superposition with the image signal by frequency duplexing.

In the slave unit 110 there are provided an original magnetic disk 114 which includes an image signal, data or data and an image signal; a spindle motor 116 for driving the magnetic disk 114; a servo circuit 118 for rotating the motor 116 at a constant speed; a magnetic head 120; a head driving circuit 122 for moving the magnetic head to a desired track; an amplifier 124; an image reproduction process circuit 126 for extracting the frequency duplexed data from the output of the amplifier 124, digitizing said data and demodulating the image signal for example into a video signal; an output terminal 128 for the image signal reproduced in the image reproduction process circuit 126; a communication circuit 130 for effecting communication with the master unit 112 for example according to the format RS232C; an input/output terminal 132 for the communication data; a central processing unit (CPU) 134 for controlling the function of the slave unit 110 and processing various data; an input switch 136 for the dubbing reproduction mode; and head moving switches 138a, 138b for instructing the CPU 134 respectively for a track down operation or a track up operation. The CPU 134 is naturally provided with a ROM, a RAM, an I/O port, etc. necessary for processing.

In the master unit 112 there are provided an input terminal 140 for the reproduced image signal from the slave unit 110; an image recording process circuit 142 for frequency duplexing the data with the image signal from the input terminal 140 and converting said signal to a recording format; an amplifier 144; a copying magnetic disk 146; a spindle motor 148 for said magnetic disk 146; a servo circuit 150 for rotating the motor 148 at a constant speed; a magnetic head 152; a head driving circuit for moving the head 152 to a desired track; an input/output terminal 156 for the data for communication with the slave unit 110; a communication circuit 158 for communication with the slave unit 110; a central processing unit (CPU) 160 for controlling the function of the master unit 112 and processing various data; a selector switch 162 for selecting a local mode; dubbing switches 164a, 164b, 164c (dubbing recording mode switch 164a; all dubbing execution switch 164b; single dubbing execution switch 164c); data setting switches 166a, 166b, 166c (data setting mode switch 166a; digit moving switch 166b; numeral input switch 166c); and an output terminal 168 for the video signal released from the image recording process circuit.

There are further shown an image monitor unit 170; a data communication line 172; and a video signal line 174.

The basic function of the slave unit 110 will be explained in the following. When the magnetic disk 114 is loaded, it is rotated at a constant speed by the servo circuit 118 and the spindle motor 116. In response to the actuation of the head moving switches 138, the CPU 134 causes the head driving circuit 122 to move the magnetic head 120 to a desired track. The signal reproduced by the magnetic head 120 from said track of the magnetic disk 114 is amplified by the amplifier 124 and supplied to the image reproduction process circuit 126, which supplies a signal, indicating the level of the reproduced signal, to the CPU 134, whereby the CPU 134 causes the head driving circuit 122 to control the position of the magnetic head 120 so as to maximize the level of the reproduced signal. In a state where the level of the reproduced signal is maximized, the image reproduction process circuit 126 extracts the data which are frequency duplexed in the reproduced signal and sends said data to the CPU 134. Said data contain track number, information on track/field mode, date, etc. The structure of such a process circuit 126 is already known and therefore will not be explained.

The reproduced image signal, subjected to the data elimination and conversion to a predetermined format in the process circuit 126 is released to the signal line 174 through the output terminal 128.

In the following there will be explained the basic function of the master unit 112. When an unrecorded magnetic disk 146 is loaded, it is rotated at a constant speed by the servo circuit 150 and the spindle motor 148. The magnetic head 152 is moved, by the head driving circuit 154, to and waits at an outermost unrecorded track. The image signal from the signal line 174 is supplied, through the input terminal 140, to the image recording process circuit 142, which sends the entered image signal to the image monitor unit 170 through the output terminal 168. If the image signal is not supplied to the input terminal 140, the process circuit 142 sends a mute signal to the output terminal 168, thereby muting the image monitor unit 170.

When the local switch 162 is turned on, the CPU 160 activates the communication circuit 158, thereby enabling the communication. When said local switch 162 is turned off, the communication with the external unit is not conducted.

The data setting switches 166 are used for entering data to be recorded together with the image signal entered to the input terminal 140. More specifically, the data setting mode is selected by the mode setting switch 166a, and a cursor is moved, by the digit moving switch 166b, to a digit where the data are to be entered, as shown in FIG. 7(b). Then data are entered by the numeral input switch 166c. For example, the number changes cyclically as 0→1→2 . . . →9→0 by the repeated actuations of the numeral input switch 166c, and the numeral is set as shown in FIG. 7(c) by stopping said actuations at a desired number. Then the cursor is moved to a desired digit by the switch 166b, and the above-explained operations are repeated to enter the data shown in FIG. 7(a). In the illustrated example, 89:03:15 indicates Mar. 15, 1989, and 12345678901 shows a serial number. Data specific to the copying magnetic disk 146, such as the track numbers thereof, are automatically generated by the CPU 160.

The data thus entered or modified are superposed on the image signal by frequency duplexing in the image recording process circuit 142, then supplied to the magnetic head 152 through the amplifier 144 and recorded on the magnetic disk 146. After said recording, the magnetic head 152 moves to a next unrecorded track.

Figure 5B:
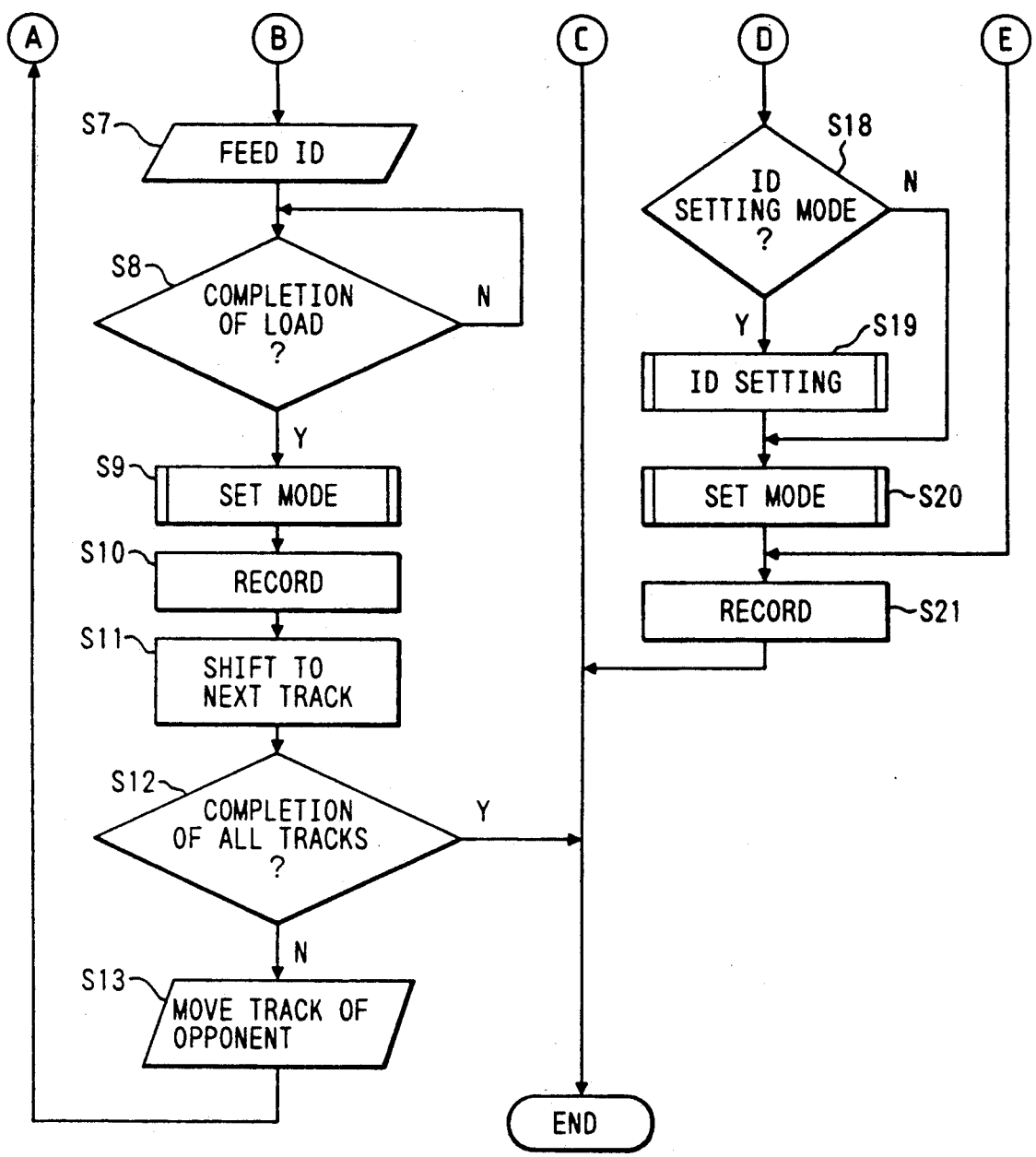
FIG. 5A and B are flow chart of a dubbing sequence.

The dubbing operation is conducted in the following manner, as indicated in a flow chart shown in FIG. 5. In a case of the dubbing operation, the dubbing mode switch 136 of the slave unit 110 and the dubbing mode switch 164a of the master unit 112 are turned on. If the dubbing-all switch 164a of the master unit 112 is turned on (S1), the state of the local switch 162 is checked (S2). If it is on, indicating the disabled communication as explained above, the sequence is terminated. If the local switch 162 is turned off, the CPU 160 causes the communication circuit 158 to send a command for confirming that the slave unit 110 is the reproducing unit and is capable of communication, to the communication circuit 130 of the slave unit 110 (S30). Said command is transmitted in a command format composed for example of a header, a code for the kind of destination unit, a code for the number of destination unit, a command code and an end flag. In the slave unit 110, the CPU 134 discriminates whether said command received from the communication circuit 130 is addressed to the slave unit 110, and, if so, executes an operation corresponding to said command. In response to said command, a response indicating the enabled communication is sent to the master unit 112, with a similar response format consisting for example of a response header, a code for the kind of unit of responder, a code for the number thereof, a response code and an end flag.

If the master unit 112 does not receive the response within a predetermined time or identifies that the other unit is not a reproducing unit capable of dubbing, the sequence is terminated (S4). If the slave unit 110 is a reproducing unit capable of dubbing, the master unit 112 sends an initializing command for initializing the slave unit 110 (S5). More specifically, the magnetic head 120 of the slave unit 110 is moved to the first track for reproduction. Then the master unit 112 discriminates whether the track of the magnetic disk 146 where the magnetic head 152 is currently positioned is unrecorded, and, if not, the dubbing sequence is terminated (S6). If it is unrecorded, the master unit 112 sends, to the slave unit 110, a command for causing the slave unit 110 to send the data of a track which is under current access (S7), and awaits the reception of data (S8). Upon receiving data from the slave unit 110, the master unit 112 extracts the field/frame information from the received data, accordingly sets the master unit 112 at the field or frame recording mode (S9), and sends said field/frame information to the image recording process circuit 142, which superposes said data on the image signal from the slave unit 110. The output of said process circuit 142 is recorded on the magnetic disk 146 (S10). The data received by the master unit 112 are displayed on the monitor unit 170, in superposition with the image signal entered through the image recording process circuit 142.

Then the master unit 112 moves the magnetic head 152 to the next track (S11), and the sequence is terminated if the recording on all the tracks is completed (S12). If not, a command for instructing movement to the next track is sent to the slave unit 110 (S13). The steps S6 to S13 are repeated until the dubbing is completed for all the tracks.

The single dubbing operation is conducted if the single dubbing switch 164c is actuated in the step S1. The master unit 112 discriminates whether the track under current access in the magnetic disk 146 is unrecorded, and the sequence is terminated if the track is already recorded (S14). If it is unrecorded, the state of the local switch 162 is checked (S15). If said local switch 162 is on, the master unit 112 sends a command to the slave 110, instructing the slave unit 110 to transmit the data of the track under current access (S16). After the data reception from the slave unit 110 (S17), if the data setting mode switch 166a is turned on (S18), the master unit 112 modifies the data received from the slave unit 110 (S19).

Figures 6, 7:
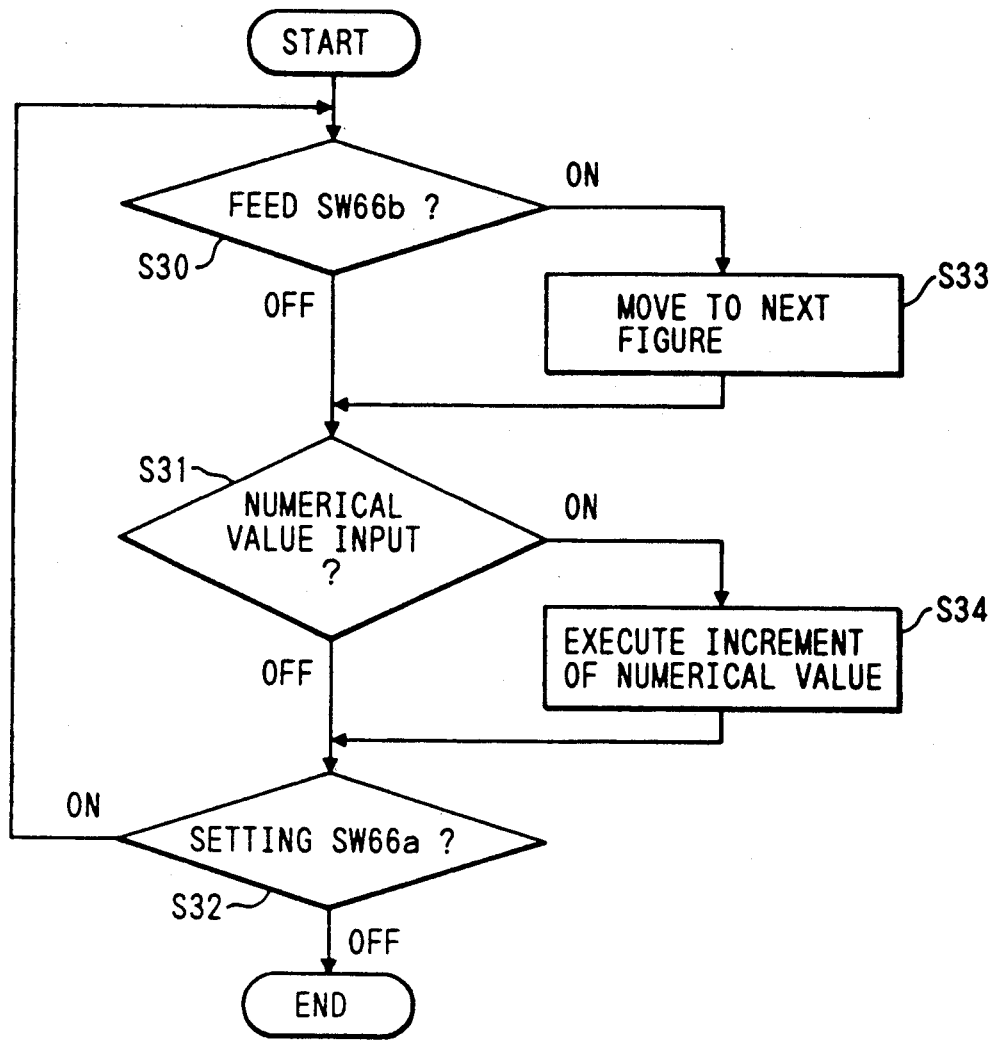
FIG. 6 is a flow chart of steps S19 and S23 in FIG. 5.
FIG. 7 is a view of an example of a display for data input and correction.

FIG. 6 is a flow chart of said step S19. If the digit movement switch 166b is actuated (S30), the cursor moves to the next digit (S33). When the numeral input switch 166c is actuated (S31), an increment is made on the numeral corresponding to the cursor (S34). Said numeral remains unchanged if the numeral input switch 166c is not actuated. Then the state of the data setting mode switch 166a is checked, and the data modification is terminated if said switch is off. The data modification is continued if said switch is on (S32).

After the data modification, the recording mode of the master unit is set according to the field/frame information contained in the data (S20), and the data from the slave unit 110 or the modified data are recorded on the magnetic disk 146 in superposition with the image signal from the slave unit 110 (S21). The single dubbing operation is thus completed.

If the local switch 162 is turned off in the step S15, the single dubbing operation is conducted without communication procedure. More specifically, if the data setting switch 166a is on (S22), data are entered in the same routine as in the step S19 (S23). The data entry is not conducted if the data setting switch 166a is off. If the data are entered in the step S21, said data are recorded in superposition with the image signal from the slave unit 110. If the data are not entered, the image signal alone is recorded. The dubbing process is thus terminated.

The communication between the circuits 130, 158 in the present embodiment is conducted according to the protocol RS232C, but there may naturally be employed other protocols, for example, parallel communication protocol. Also, the entry and modification of the data may be conducted by other input means such as numeral keys or an adjustable dial. Also, the recording unit and the reproducing unit respectively serve as the master unit and the slave unit, but these roles may naturally be inverted.

These points apply also to the following embodiments.

As will be easily understood from the foregoing description, the present embodiment enables copying of the signal of the original medium by an extremely simple operation and copying of the recorded data after modification or correction.

Also, in the foregoing description, the modification of the ID data is conducted manually, but it may also be conducted automatically in the recording unit.

In the following there will be explained a third embodiment of the present invention, which is capable of recording the image signal either in a first recording mode for recording the image signal of a field on a track formed on a recording medium or in a second recording mode for recording the image signal of a frame on two tracks formed on the recording medium, and is provided with recording operation control means for prohibiting the recording operation in said second recording mode in a case when the image signal of a field is supplied in repetition.

Figure 8:
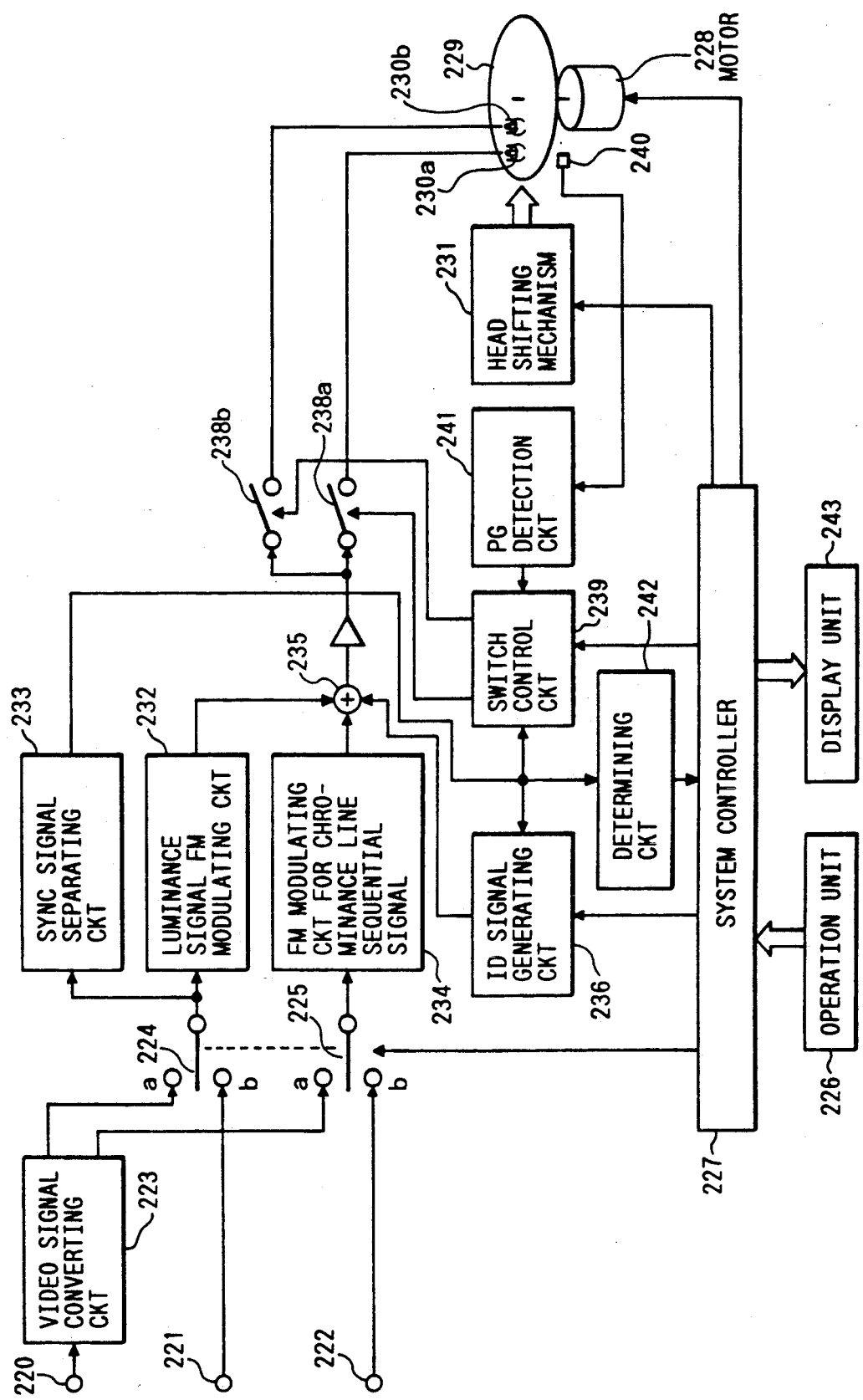
FIG. 8 is a block diagram of a still video recording apparatus constituting a third embodiment of the present invention.
Figure 9:
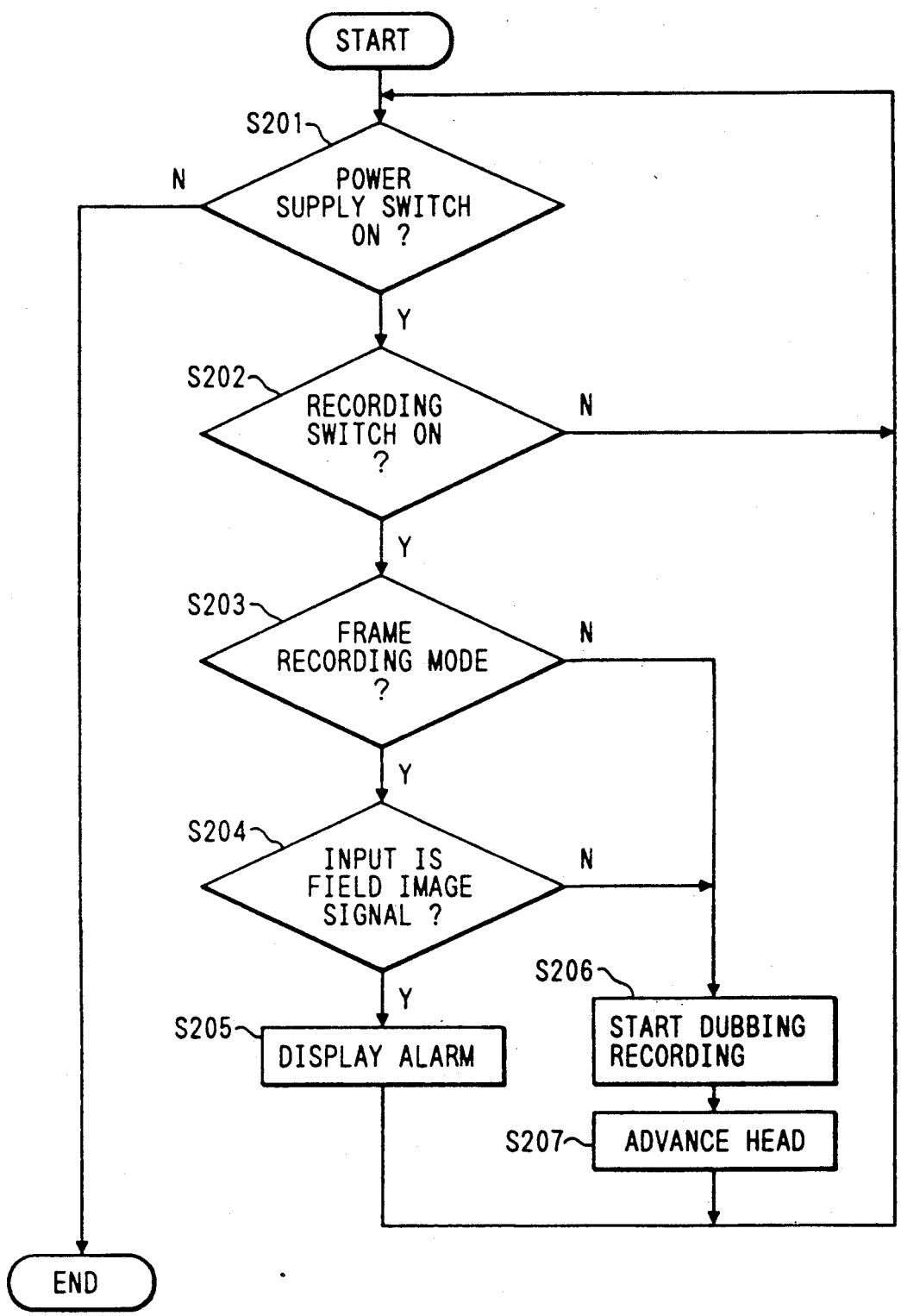
FIGS. 9, 10 and 11 are flow charts showing an example of a dubbing operation in the still video recording apparatus shown in FIG. 8.

FIG. 8 is a block diagram of a still video recording apparatus constituting the third embodiment of the present invention, and FIG. 9 is a flow chart of an example of the dubbing operation in the apparatus shown in FIG. 8.

The still video recording apparatus shown in FIG. 8 is a provided with a composite video signal input terminal 220 for connecting an external image input unit such as a video camera, and dubbing input terminals 221, 222 to be connected with a reproducing unit as explained above, for entering luminance signals and color difference line-sequential signals respectively.

In the following there will be explained an ordinary recording operation for recording, on the magnetic disk, the composite video signal supplied from a video camera connected to the composite video input terminal 220.

When a power switch in an operation unit 226 is actuated, a system controller 227 activates a motor 228 to rotate a magnetic disk 229 at a predetermined revolution.

Then a track designating switch in the operation unit 226 is actuated, whereby the system controller 227 so instructs a head moving mechanism 231 as to move magnetic heads 230a, 230b to desired tracks of the magnetic disk 229 designated by said switch. Thus the heads 230a, 230b are moved to enter a stand-by state for recording. Then the following operation is conducted in response to the actuation of a recording switch of the operation unit 226.

In the normal recording operation, the dubbing mode switch of the operation unit 226 is turned off, so that switches 224, 225 are connected to the side according to the instruction by the system controller 227.

The composite video signal entered from the input terminal 220 is converted, in a video signal converting circuit 223, into a luminance signal Y and a line-sequential color difference signal C. Said luminance signal Y is supplied, through the switch 224 positioned at the side a, to a luminance signal FM modulating circuit 232 and a synchronization signal separating circuit 233, while the color difference signal C is supplied to a modulating circuit 234 through the switch 225 positioned at the side a.

The modulating circuit 232 executes frequency modulation, in a high frequency region, of the luminance signal Y supplied from the converting circuit 223 through the switch 224, and supplies the obtained signal to an adding circuit 235. The modulating circuit 234 executes frequency modulation, in a low frequency region, of the color difference signal C supplied from said converting circuit 223 and supplies the obtained signal to the adding circuit 235.

On the other hand, the sync signal separating circuit 233 separates the synchronization signal contained in the luminance signal Y supplied from the converting circuit 223 through the switch 224, and sends said synchronization signal to an ID signal generating circuit 236.

In the operation unit 226, there is selected either the field recording mode or the frame recording mode, and there are set other data such as date and time corresponding to the image signal to be recorded.

Said recording mode and other data are supplied, in the form of digital data, from the system controller to the ID signal generating circuit 236.

Said generating circuit 236 is provided with an oscillator for generating a carrier signal of a frequency 13 fH (fH is the horizontal synchronization frequency), and forms the ID signal for supply to the adding circuit 235 by a known DPSK (differential phase shift keying) modulation of said carrier signal by the digital data supplied from the system controller 227 in synchronization with the sync signal supplied from the separating circuit 233.

The adding circuit 235 adds, by frequency multiplexing, the FM luminance signal from the modulating circuit 232, the line-sequential FM color difference signal from the modulating circuit 234 and the ID signal from the generating circuit 236, and the obtained signal is amplified in a recording amplifier 237 and supplied to switches 238a, 238b.

Said switches are controlled by a switch control circuit 239 as will be explained in the following.

The switch control circuit 239 receives information, indicating the field or frame recording mode, selected by the mode setting switch of the operation unit 226.

The unrepresented core of the magnetic disk 229 is provided with a magnetic piece for indicating the rotating period of said disk 229, and a PG coil 240 generates a pulse upon detecting said magnetic piece in the course of rotation of the magnetic disk 229. Said pulse is subjected to wave form shaping in a PF detecting circuit 241 and is supplied, as a PG pulse indicating the rotating period of the magnetic disk 229, to the switch control circuit 239, which also receives the synchronization signal separated in the separating circuit 233.

The switch control circuit 239 at first opens the switches 238a, 238b. If the recording mode information supplied from the system controller 227 indicates the frame recording mode, the switch control circuit 239 closes the switch 238a for the first field period after the reception of the PG pulse from the PG pulse detecting circuit 241, and then closes the switch 238b for the next field period. If said recording mode information from the system controller 227 indicates the field recording mode, the switch control circuit 239 closes the switch 238a for a field period after the supply of the PG pulse from the detecting circuit 241.

Owing to the above-explained control of the switches 238a, 238b by the switch control circuit 239 according to the recording mode information supplied from the system controller 227, the composite video signal entered from the input terminal 220 is recorded on the magnetic disk 229, either in the frame recording mode or in the field recording mode.

Figure 12:
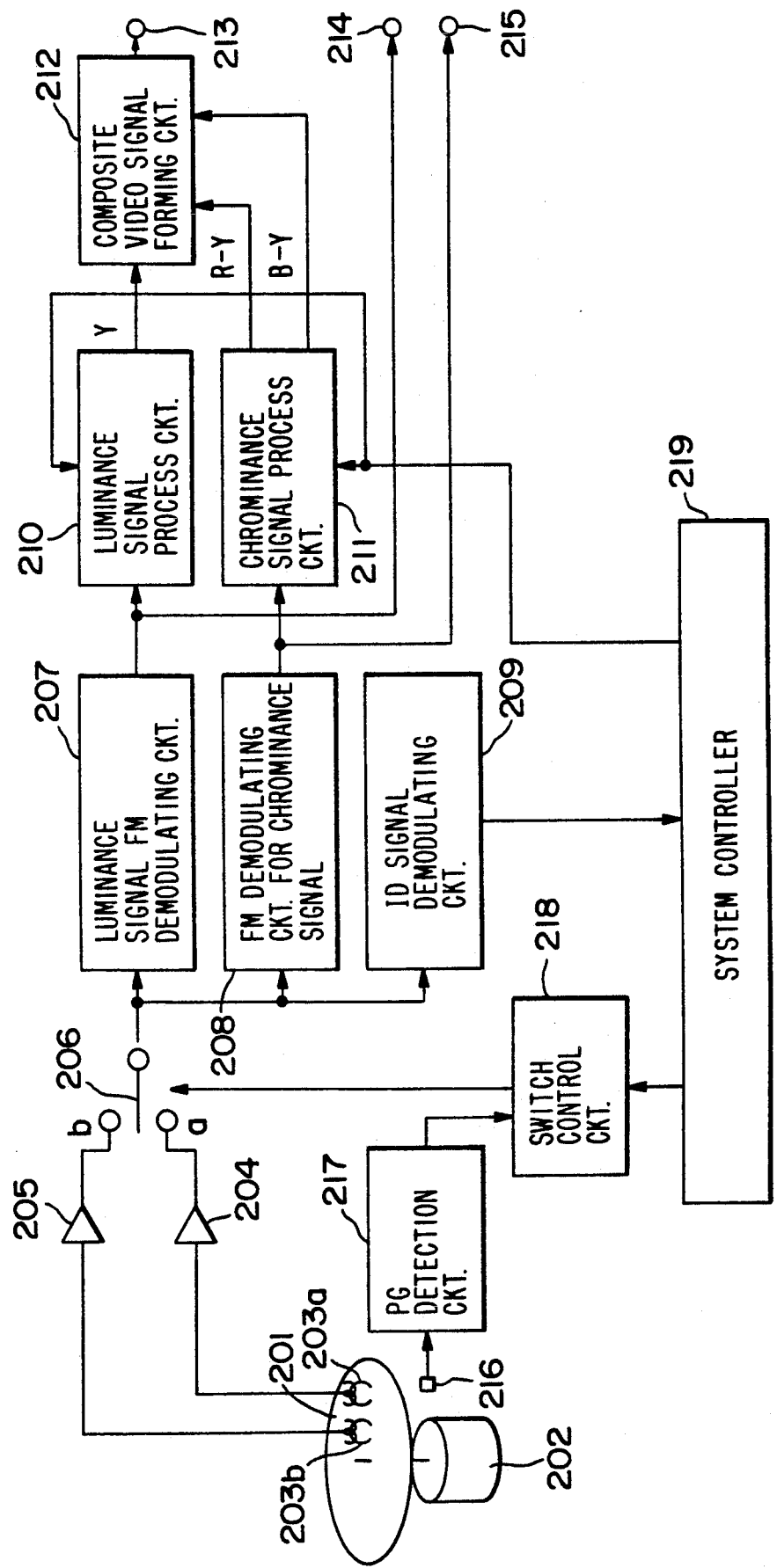
FIG. 12 is a schematic view of a reproducing unit in a conventional dubbing system.

In the following there will be explained, with reference to a flow chart shown in FIG. 9, a dubbing operation by connecting a reproducing unit as shown in FIG. 12 to the dubbing input terminals 221, 222 and recording the image signal, reproduced from a magnetic disk in said reproducing unit, onto the magnetic disk.

When a power switch of the operation unit 226 is actuated in the dubbing operation (S201 in FIG. 9), the system controller 227 sends instructions to various units and maintains the apparatus in a standby state in the normal recording, until the recording switch of the operation unit 226 is actuated (S202 in FIG. 9).

Since the dubbing mode switch of the operation unit 226 is closed in the dubbing operation, the switches 224, 225 are connected to the side b by the system controller 227, whereby the luminance signal Y' supplied form the external reproducing unit through the input terminal 221 is supplied, through said switch 224, to the luminance signal modulating circuit 232 and the sync signal separating circuit 233. Also, the line-sequential color difference signal C' supplied from the input terminal 222 is supplied to the color difference signal modulating circuit 234 through said switch 225.

The FM luminance signal from the modulating circuit 232 and the FM color difference signal from the modulating circuit 234 are supplied to the adding circuit 235 which superposes, by frequency multiplexing, the ID signal including the information on the recording mode selected by the mode setting switch of the operation unit 226, in the same manner as in the normal recording operation. The obtained signal is amplified in the recording amplifier 237 and supplied to the switches 238a, 238b.

The synchronization signal separated in the separating circuit 233 is also supplied to the determining circuit 242, which determines whether the luminance signal Y' and the line-sequential color difference signal C' supplied from the input terminals 221, 222 are recorded in the field or frame recording mode, by inspecting the supplied synchronization signal.

The determining circuit 242 identifies that the luminance signal Y' and the color difference signal C' supplied from the input terminals 221, 222 are recorded in the frame recording mode if a synchronization signal indicating an odd field and a synchronization signal indicating an even field are alternately detected in each of the field periods, but identifies that said signals are recorded in the field recording mode if synchronization signals indicating odd fields or even fields are detected in succession, and sends the identified recording mode to the system controller 227.

In a case when the field recording mode is selected by the mode setting switch of the operation unit 226, or in a case when the frame recording mode is selected by said mode setting switch and the determining circuit 242 identifies that the luminance signal Y' and the color difference signal C' received from the input terminals 221, 222 are recorded in the frame recording mode, the system controller 227 causes the switch control circuit 239 to control the switches 238a, 238b according to the thus selected recording mode, in the same manner as in the normal recording operation, thereby dubbing the image signal from the recording amplifier onto the magnetic disk 229. After the recording, it causes the head moving mechanism 231 to move the magnetic head 230a, 230b to neighboring tracks and enters the stand-by state again (S203, S204, S206, S207 in FIG. 9).

On the other hand, in a case when the frame recording mode is selected by the mode setting switch of the operation unit 226 but the determining circuit 242 identifies that the luminance signal Y' and the color difference signal C' received from the input terminals 221, 222 are recorded in the field recording mode, the system controller 227 causes the display unit 243 to display a warning, and maintains the apparatus in the stand-by state without a dubbing operation (S203–S205 in FIG. 9).

As explained above, if the image signal supplied from an external reproducing unit through the dubbing input terminal is in the field recording mode but the recording unit is set at the frame recording mode, a warning is displayed but the dubbing operation is not conducted. It is therefore rendered possible to prevent, in the dubbing operation in the frame recording mode, recording of the same image signal of a field on two adjacent tracks on the magnetic disk, thereby achieving a proper dubbing operation.

Figure 10:
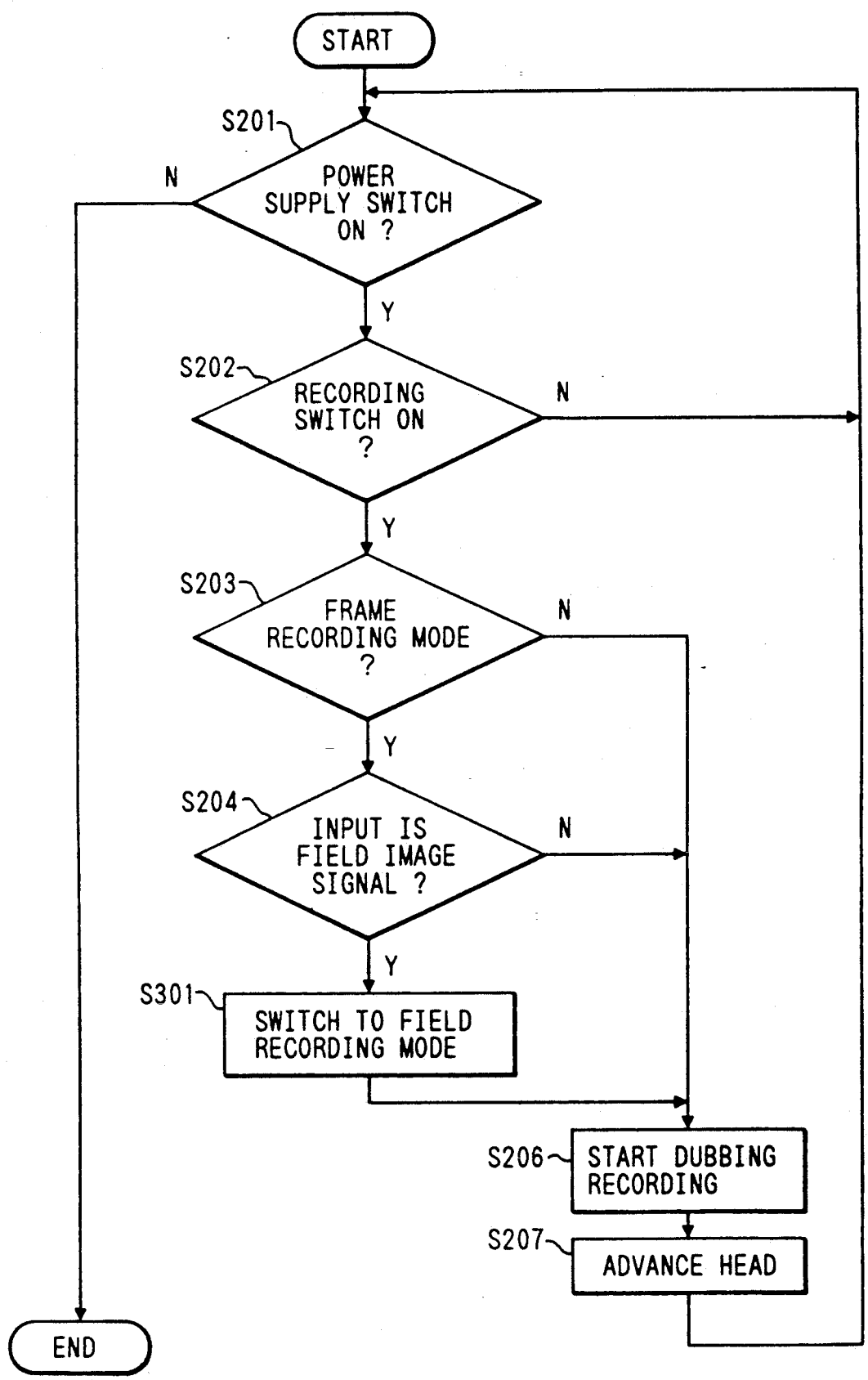

FIG. 10 is a flow chart showing another example of the operation in dubbing with the still video recording apparatus shown in FIG. 8.

In the following there will be explained the operations of FIG. 10 which are different from those in FIG. 9. The same operations as in FIG. 9 are represented by the same numbers and will not be explained further.

In the flow chart shown in FIG. 9, if the frame recording mode is selected by the mode setting switch of the operation unit 226 and the determining circuit 242 identifies that the luminance signal Y' and the line-sequential color difference signal C' supplied from the input terminals 221, 222 are recorded in the field recording mode, the dubbing operation is not conducted and a warning is displayed on the display unit 243. On the other hand, in the flow chart shown in FIG. 10, if the frame recording mode is selected by the mode setting switch of the operation unit 226 and the determining circuit 242 identifies that the luminance signal Y' and the color difference signal C' supplied from the input terminals 221, 222 are recorded in the field recording mode, the system controller 227 changes the recording mode automatically to the field recording mode and effects the dubbing operation in said field recording mode (S203, S204, S301, S206 in FIG. 10). In this manner it is rendered possible to prevent the recording of the same image signal of a field on two adjacent tracks on the magnetic disk. Thus, if an image signal recorded in the field recording mode on a magnetic disk is reproduced by an external reproducing unit and supplied through the dubbing input terminal, the recording unit is automatically shifted to the field recording mode for recording said image signal.

Figure 11:
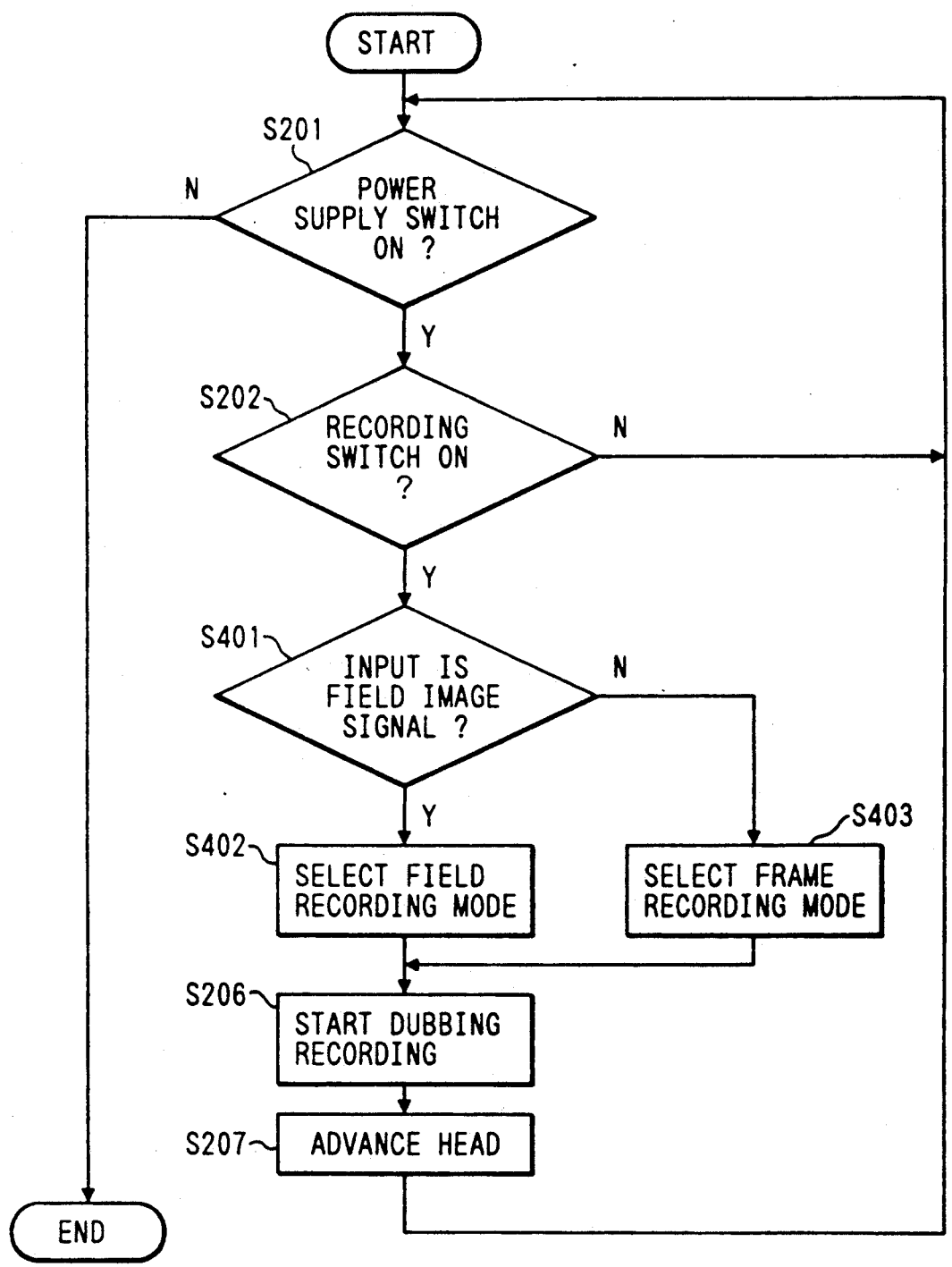

FIG. 11 is a flow chart showing another example of the dubbing operation in the still video recording apparatus shown in FIG. 8.

In the following there will be explained the operations shown in FIG. 11, but the same operations as those in FIG. 9 are represented by the same numbers and will not be explained further.

In FIG. 11, if the determining circuit 242 identifies that the luminance signal Y' and the line-sequential color difference signal C' supplied from the input terminals 221, 222 are recorded in the field recording mode, the system controller 227 automatically switches the recording mode to the field recording mode and executes the dubbing operation in said field recording mode. On the other hand, if the determining circuit 242 identifies that said signals are recorded in the frame recording mode, the system controller 227 automatically selects the frame recording mode to effect the dubbing operation in said frame recording mode (S401, S402, S403, S206 in FIG. 11). It is therefore rendered possible to prevent the recording of the same image signal of a field on two adjacent tracks on the magnetic disk. Thus, if an image signal recorded in the field recording mode on a magnetic disk is reproduced by an external reproducing unit and supplied through the dubbing input terminal, the recording unit is automatically shifted to the field recording mode for recording said image signal, and, if an image signal recorded in the frame recording mode on a magnetic disk is reproduced by an external reproducing unit and supplied through the dubbing input terminal, the recording unit is automatically shifted to the frame recording mode for recording said image signal.

As explained in the foregoing, the present embodiment provides an image signal recording apparatus capable of a proper dubbing operation.

In the foregoing embodiments there have been disclosed an apparatus for recording an audio signal and a still image signal as an application of the present invention, but the present invention is further applicable to any of mutually different signals. The apparatus embodying the present invention may be designed to process only one of said two signals.

What is claimed is:

1. A dubbing system comprising:
   a reproducing apparatus for reproducing and outputting signals recorded on a medium on which image and audio signals are capable of being recorded; and
   a recording apparatus for recording given image and audio signals at a desired position on a medium;
   wherein each of said reproducing apparatus and said recording apparatus comprises communication means for executing mutual communications, said reproducing apparatus and said recording apparatus cooperatively operate for a dubbing sequence through mutual communication between a plurality of said communication means and said reproducing apparatus simultaneously outputs relative image and audio signals to said recording apparatus to maintain a predetermined relationship between the image and audio signals.

2. A dubbing system according to claim 1, wherein information communicated between said plurality of communication means is information indicative of a corresponding relation between image and audio outputted from said reproducing apparatus.

3. A dubbing system according to claim 1, wherein information communicated between said plurality of communication means is information for initializing said reproducing apparatus for a reproducing operation.

4. A dubbing system according to claim 1, wherein said reproducing apparatus further comprises first output means for outputting the image and audio; and second output means for causing said communication means to output information.

5. A dubbing system according to claim 1, wherein said recording apparatus further comprises first input means for inputting the image and audio; and second input means for inputting information into said communication means.

6. A dubbing system according to claim 1, wherein the medium comprises a disk-shaped medium.

7. A dubbing system according to claim 1, wherein the image and audio are recorded on respectively different areas on the medium.

8. A dubbing system comprising:
a reproducing apparatus for reproducing and outputting signals recorded on a medium on which image and audio signals are capable of being recorded;
a recording apparatus for recording given image and audio signals at a desired position on a medium;
wherein each of said reproducing apparatus and said recording apparatus comprises communication means for executing mutual communications, and said recording apparatus comprises changing means for changing, in only a predetermined mode among a plurality of dubbing modes, an identification code which identifies attributes of the image and audio and which should be recorded together with the given image and audio signals.

9. A dubbing system according to claim 8, wherein the identification code includes numerical value data.

10. A dubbing system according to claim 8, wherein said changing means comprises designation means for manually designating the identification code and wherein said recording means comprises means for recording the identification code designated by said designation means together with the given image and audio.

11. A dubbing system according to claim 8, wherein said communication means in said recording apparatus comprises means for initializing said reproducing apparatus for a reproducing operation.

12. A dubbing system according to claim 8, wherein said reproducing apparatus further comprises first output means for outputting the image and audio; and second output means for causing said communication means to output information.

13. A dubbing system according to claim 8, wherein said recording apparatus further comprises first input means for inputting the image and audio; and second input means for inputting information into said communication means.

14. A dubbing system according to claim 8, wherein the medium comprises a disk-shaped medium.

15. A dubbing system according to claim 8, wherein the image and audio signals are recorded on respectively different areas on the medium.

* * * * *

UNITED STATES PATENT AND TRADEMARK OFFICE
CERTIFICATE OF CORRECTION

PATENT NO. : 5,187,616

DATED : February 16, 1993

INVENTOR(S) : Norio Kimura, et al.

It is certified that error appears in the above-identified patent and that said Letters Patent is hereby corrected as shown below:

COLUMN 2

Line 40, "containg" should read --containing--.

COLUMN 4

Line 67, "diagram" should read --diagrams--.

COLUMN 5

Line 5, "chart" should read --charts--.

COLUMN 14

Line 30, "form" should read --from--.

Signed and Sealed this

Eighteenth Day of January, 1994

*Attest:*

BRUCE LEHMAN

*Attesting Officer*  *Commissioner of Patents and Trademarks*